(12) United States Patent
Spain

(10) Patent No.: US 7,967,883 B2
(45) Date of Patent: Jun. 28, 2011

(54) EXTRACTOR FOR VACUUM CLEANING SYSTEM

(75) Inventor: David Milton Spain, Eight Mile Plains (AU)

(73) Assignee: Maxivac Pty Ltd. (AU)

( * ) Notice: Subject to any disclaimer, the term of this patent is extended or adjusted under 35 U.S.C. 154(b) by 644 days.

(21) Appl. No.: 11/996,199

(22) PCT Filed: Jul. 21, 2006

(86) PCT No.: PCT/AU2006/001035
§ 371 (c)(1),
(2), (4) Date: Jan. 18, 2008

(87) PCT Pub. No.: WO2007/009193
PCT Pub. Date: Jan. 25, 2007

(65) Prior Publication Data
US 2008/0236399 A1    Oct. 2, 2008

(30) Foreign Application Priority Data
Jul. 21, 2005   (AU) ................ 2005903863

(51) Int. Cl.
*B01D 47/16*   (2006.01)
(52) U.S. Cl. ........... 55/337; 55/345; 55/423; 55/424; 55/428; 55/429; 55/466; 55/467; 55/DIG. 3
(58) Field of Classification Search ........... 55/337, 55/55, 345, 428–429, DIG. 3, 466–467, 423–424; 96/321
See application file for complete search history.

(56) References Cited

U.S. PATENT DOCUMENTS

| | | | | |
|---|---|---|---|---|
| 3,957,646 | A | * | 5/1976 | Wickert ............ 210/242.3 |
| 4,015,957 | A | * | 4/1977 | Grantham ............ 96/241 |
| 4,062,085 | A | | 12/1977 | Duncan |
| 4,885,817 | A | | 12/1989 | Tanase |
| 5,372,707 | A | * | 12/1994 | Buchanan et al. ........... 208/161 |
| 5,779,746 | A | * | 7/1998 | Buchanan et al. ........... 55/452 |
| 6,122,797 | A | | 9/2000 | Vanderlinden |
| 6,161,250 | A | | 12/2000 | Young et al. |
| 6,742,219 | B2 | | 6/2004 | Lenzmeier et al. |
| 6,868,578 | B1 | * | 3/2005 | Kasper et al. ........... 15/347 |
| 7,273,506 | B2 | * | 9/2007 | Oh et al. ........... 55/343 |
| 7,472,456 | B2 | * | 1/2009 | Moore et al. ........... 15/323 |
| 2006/0117723 | A1 | * | 6/2006 | Yoo ........... 55/428 |
| 2007/0266683 | A1 | * | 11/2007 | McDowell ........... 55/429 |

FOREIGN PATENT DOCUMENTS

WO   2004112938 A1   12/2004

* cited by examiner

*Primary Examiner* — Duane Smith
*Assistant Examiner* — Ives Wu
(74) *Attorney, Agent, or Firm* — Krugliak, Wilkins, Griffiths & Dougherty Co., L.P.A.; David P. Dureska; Brent L. Moore

(57) ABSTRACT

An extractor for a vacuum cleaning system of the type based on a cyclonic separator. The extractor comprises an annular body located adjacent the cyclonic separator and has an annular opening communicating with the cyclonic separator. A mesh covers the annular opening. In use the air circulating in the cyclonic separator vents through the extractor but debris in the air stream is stopped by the mesh.

7 Claims, 3 Drawing Sheets

EXTRACTOR FOR VACUUM CLEANING SYSTEM

This application claims the benefit of PCT Application Ser. No. PCT/AU2006/001035 filed Jul. 21, 2006, and Australian Patent Application Serial No. 200590363, filed Jul. 21, 2005

This invention relates to industrial scale vacuum cleaners. In particular, it relates to an extractor that improves the effectiveness of certain known vacuum cleaning systems.

BACKGROUND TO THE INVENTION

Large scale vacuum cleaners are known for a variety of applications, such as cleaning debris from the side of roads.

One such device is known as a "Truck Loader" and is manufactured by Giant-Vac of Georgia, USA. The "Truck Loader" is described at www.giant-vac.com and consists of a diesel or gas engine driving a four blade impellor. Leaves and other debris are sucked through an intake by the impellor and directed through an outlet to a truck or trailer.

The Giant-Vac device does not separate the debris from the air flow but merely uses the air flow to transport the debris. Other devices operate in the same way as the Giant-Vac device but add various forms of separators to remove the debris from the air flow. An example of such a device is found in U.S. Pat. No. 4,885,817, assigned to Howa Machinery Ltd. The patent describes a device that uses a blower to generate a current of air to collect rubbish which is deposited in a rubbish hopper. The device includes a cylindrical air-dust separation chamber that centrifugally separates the dust from the air stream. The cylindrical chamber is generally referred to in the art as a cyclone, or cyclone separator.

To improve separation of rubbish and dust from the air stream it is known to use a pair of cyclone separators. The first cyclone separator extracts rubbish and debris from the air stream but does not extract light particles such as dust. The second cyclone separator extracts the dust, thus expelling clean air to the environment.

Notwithstanding the available technology the inventor has found that the existing systems can be made to operate more effectively.

OBJECT OF THE INVENTION

It is an object of the present invention to provide an extractor for a vacuum cleaning system.

It is a further object to provide improvements to known vacuum cleaning systems.

Further objects will be evident from the following description.

DISCLOSURE OF THE INVENTION

In one form, although it need not be the only or indeed the broadest form, the invention resides in an improvement for a vacuum cleaning system of the type comprising a blower that generates an air stream and a cyclonic separator that separates debris from the air stream; the improvement comprising an extractor located adjacent the cyclonic separator, said extractor having an annular body truncated on an axis perpendicular to a plane of the annular body to form an opening communicating with the cyclonic separator; and a mesh covering the opening.

In a further form the invention resides in a debris collection device comprising:
a blower generating an air stream;
a cyclonic separator that separates debris from the air stream; and
an extractor located adjacent the cyclonic separator, said extractor having an annular body truncated on an axis perpendicular to a plane of the annular body to form an opening communicating with the cyclonic separator and a mesh covering the opening.

BRIEF DETAILS OF THE DRAWINGS

To assist in understanding the invention preferred embodiments will now be described with reference to the following figures in which.

DETAILED DESCRIPTION OF THE DRAWINGS

Figure 1:
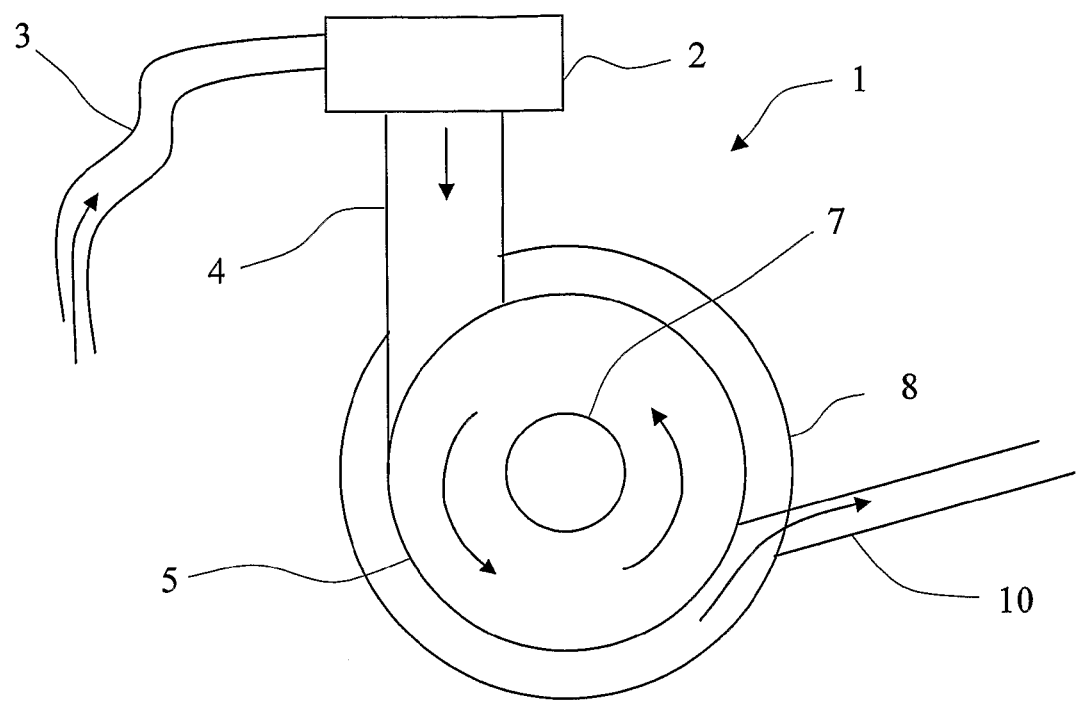
FIG. 1 is a conceptual top view of a first embodiment of a vacuum cleaning system and extractor.

In describing different embodiments of the present invention common reference numerals are used to describe like features.

Figure 2:
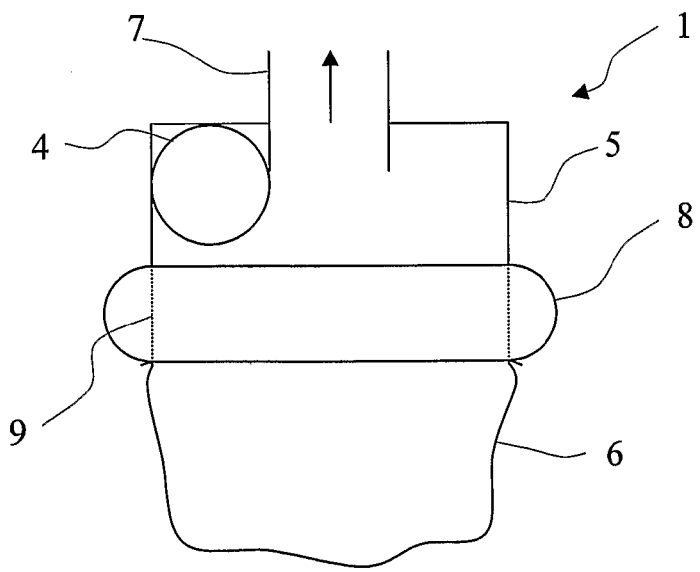
FIG. 2 is a sketch of a side view of the embodiment of FIG. 1.

Referring to FIG. 1 and FIG. 2, there is shown a conceptual top view of a vacuum cleaning system 1. A blower 2 sucks debris through hose 3 and forces it through intake 4, as shown by the arrows. It is sensible if the hose is made from clear plastic so any blockages can be observed. The air flow circulates within a cylindrical separator 5. Centrifugal action causes the debris to move towards the outside of the cylinder where it slows down and drops from the air flow into a container in the form of a collection bag 6. In one preferred embodiment, slow moving air is expelled through low pressure vent 7, although the inventors have found that the vent 7 is not required in many applications. The parts of the system described above are similar to a conventional cyclone separator as is known in the art.

An extractor 8 is fitted below the cylinder 5. The extractor 8 is a semi-circular annulus with a mesh 9 covering an opening on the cylinder side. The rotating air is extracted through the extractor and expelled through high pressure vent 10. The mesh 9 has a weave that is sufficiently open to permit air flow without causing a significant drop in pressure but the weave is sufficiently close to stop the passage of most debris.

The inventor has found that the addition of an extractor to a conventional cyclone separator results in a significant improvement in performance so that a relatively low-powered blower is able to collect debris and separate it from the air flow.

The arrangement shown in FIG. 1 and FIG. 2 may find a wide variety of applications. One particular application considered by the inventor is to combine the vacuum system with a sweeper for cleaning roads, car parks, golf courses or other terrain. Another application is cleaning of waterways.

Figure 3:
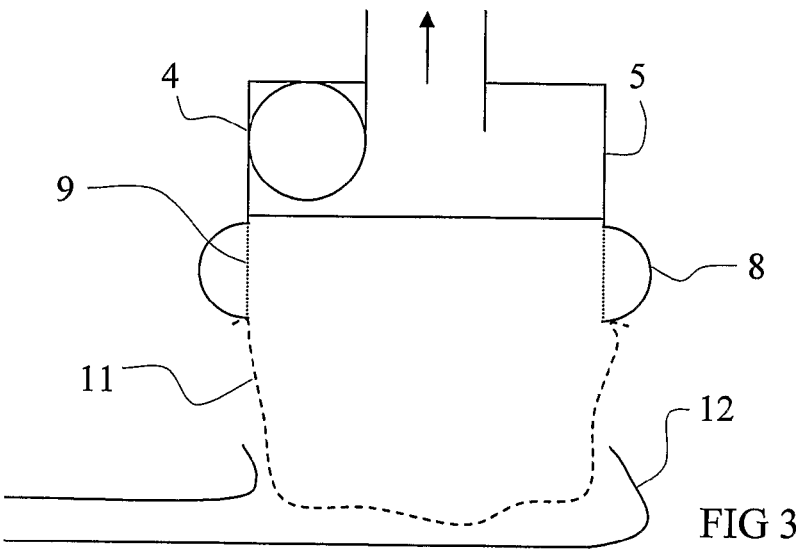
FIG. 3 is a sketch of a side view of a second embodiment of a vacuum cleaning system.

An embodiment particularly useful for cleaning waterways is shown in FIG. 3. The embodiment of FIG. 3 is similar to that of FIG. 2 but the collection bag 6 is replaced with a porous bag 11. A water collector 12 is positioned below the porous bag 11 to return water that drains from the bag 11. In one installation an arrangement of scoops collect debris from near the surface of the water of a lake or bay. The hose 3 is positioned adjacent the scoops so that the debris and some water is sucked into the vacuum cleaning system 1. The system works in the manner described above and water is returned to the lake or bay at the rear of the boat via collector 12.

The inventors speculate that the embodiment may also be suitable for cleaning of oil spills from waterways. The difference in specific gravity of oil and water facilitates separation in the cyclonic separator.

Figure 4:
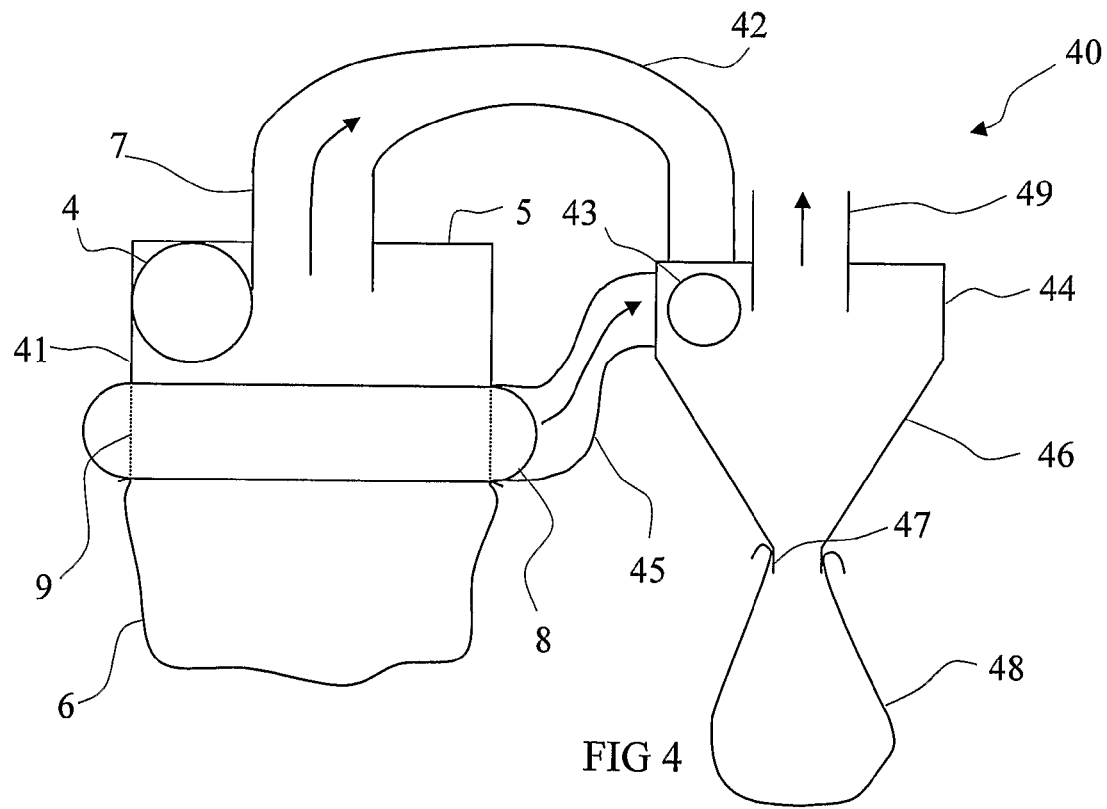
FIG. 4 is a sketch of a third embodiment of a vacuum cleaning system.

In many applications, particularly indoor cleaning, it is desirable to control the amount of dust and other small particles that are released into the environment. This can be achieved with the embodiment of FIG. 4. In FIG. 4 is shown an embodiment 40 utilising a pair of separators. The primary separator 41 is as described above with respect to FIG. 2 including extractor 8. A pipe 42 connects the air flow from low pressure vent 7 to an intake 43 of the second separator 44. Another pipe 45 connects the high pressure air flow from the extractor 8 to the same intake 43. The second separator 44 has a cone 46 that assists with a rapid drop in pressure and air flow in the separator 44 so that dust entrained in the air flow will fall through outlet 47. A collection bag 48 is connected to the outlet 47. Relatively clean low pressure air is expelled through vent 49.

The inventor has found that the embodiment of FIG. 4 is particularly useful for collecting debris from roads and car-parks. It is also useful for indoor cleaning, such as in sport stadiums, as it captures dust as well as debris.

A filter may be provided at the vent 49 to capture any dust that is not separated from the air stream by the second separator 44. This may be particularly important for applications of the invention to moving grain in grain silos or bulk carriers where grain dust raises a risk of explosion.

Figure 5:
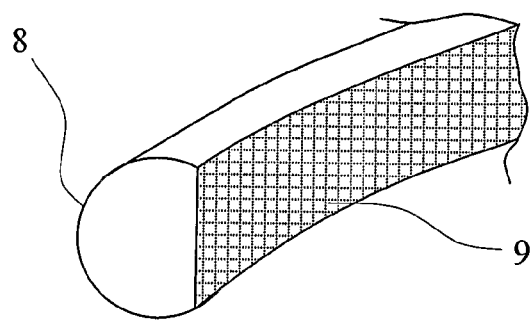
FIG. 5 is an enlarged view of a portion of an extractor.

The structure of the extractor 8 is shown in greater detail in FIG. 5. The extractor 8 has an annular shape that follows the curve of the cylindrical separator 5. A cross-section of the extractor 8 is substantially circular as shown in FIG. 5 but truncated along a chord. The diameter of the annular ring at the chord closely matches the diameter of the cylindrical separator 5 as shown in FIG. 1. The truncation forms an opening in the extractor that is covered by mesh 9. The mesh suitably has a size of around 1 cm square openings, although this dimension will be selected to suit particular applications.

The inventor has found that the addition of the extractor has particularly beneficial impact on the operation of the vacuum cleaning system. The extractor provides a rapid drop in air flow towards the bottom of the cylindrical separator thereby causing the debris to drop from the air flow. Dust that is still entrained in the air flow may be separated in a cyclonic separator, as shown in FIG. 4.

Figure 6:
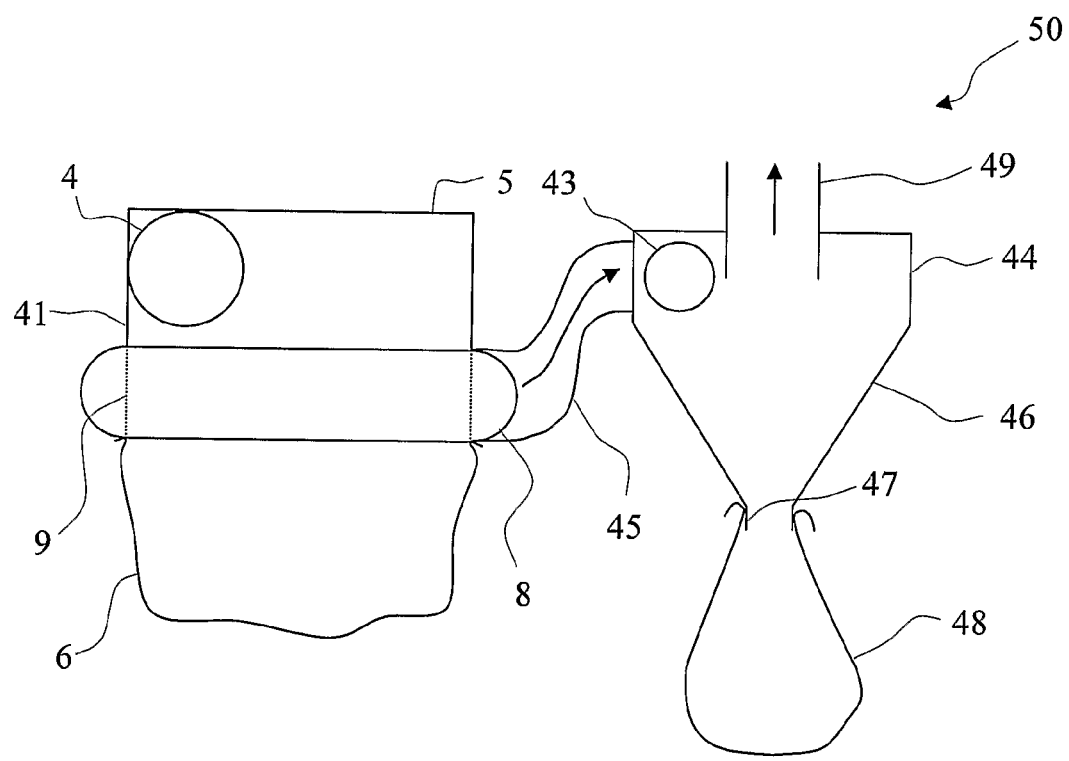
FIG. 6 is a sketch of a modification of the third embodiment of FIG. 4.

As mentioned above the inventors have found that the low pressure vent 7 and pipe 42 are not essential for good performance. This variation is shown in FIG. 6 where a pair of separators 41, 44 are arranged as in FIG. 4 but the only connection is via high pressure pipe 45. In other aspects the embodiment of FIG. 6 is the same as the embodiment of FIG. 4.

Throughout the specification the aim has been to describe the invention without limiting the invention to any particular combination of alternate features.

The invention claimed is:

1. A debris collection device comprising:
   a scoop adapted to collect debris from near the surface of a waterway;
   a blower generating an air stream;
   a hose adjacent the scoop and connected to the blower such that debris and water is entrained by the air stream;
   a cyclonic separator that separates debris from the air stream and additionally separates water from the air stream;
   a debris container locater below the cyclonic separator to collect debris but allow draining of water; and
   an extractor located adjacent the cyclonic separator, said extractor having an annular body truncated on an axis perpendicular to a plane of the annular body to form an opening communicating with the cyclonic separator and a mesh covering the opening.

2. The debris collection device of claim 1 wherein the debris container is porous.

3. A debris collection device comprising:
   a blower generating an air stream;
   a first cyclonic separator that separates debris from the air stream;
   an extractor located adjacent the cyclonic separator, said extractor having an annular body truncated on an axis perpendicular to a plane of the annular body to form an opening communicating with the cyclonic separator, a mesh covering the opening and a high pressure vent; and
   a second cyclonic separator that separates dust from an air flow from the vent.

4. The debris collection device of claim 3 further comprising a debris container attached the first cyclonic separator.

5. The debris collection device of claim 3 further comprising a dust container attached the second cyclonic separator.

6. The debris collection device of claim 3 further comprising a pipe connecting a low pressure vent in the first cyclonic separator to the second cyclonic separator.

7. The debris collection device of claim 3 further comprising a low pressure vent in the second cyclonic separator.

* * * * *

UNITED STATES PATENT AND TRADEMARK OFFICE
CERTIFICATE OF CORRECTION

PATENT NO. : 7,967,883 B2  Page 1 of 1
APPLICATION NO. : 11/996199
DATED : June 28, 2011
INVENTOR(S) : David Milton Spain It is certified that error appears in the above-identified patent and that said Letters Patent is hereby corrected as shown below:

IN THE CLAIMS:

Column 4, Claim 3, Line 40, after the word "the" insert the words --high pressure--.

Signed and Sealed this
Sixth Day of September, 2011

David J. Kappos
*Director of the United States Patent and Trademark Office*